2,966,445
SUBMERGED FERMENTATION PROCESS FOR INCREASING YIELDS OF MICROCOCCUS LYSODEIKTICUS

Roland F. Beers, Jr., 4309 Wendover Road, Baltimore 18, Md.

No Drawing. Filed Nov. 21, 1956, Ser. No. 623,530

5 Claims. (Cl. 195—102)

This invention relates to a submerged fermentation process. Particularly the invention relates to an improved fermentation process for the production of cells of *Micrococcus lysodeikticus*. More particularly the invention relates to an improved fermentation process for the production of large amounts of cells of *Micrococcus lysodeikticus* wherein a submerged culture technique is utilized.

In the past, cells of *Micrococcus lysodeikticus* have been produced by fermentation techniques. However, for the production of large amounts of cells these techniques have uniformly consisted in surface culture techniques which for many reasons were unsatisfactory and inconvenient. Among the more undesirable features of this surface fermentation has been the large amount of surface space required with its corresponding dangers of contamination. Economic considerations such as labor and production costs militate against the use of surface techniques in any commercial process.

Many attempts have been made to grow *Micrococcus lysodeikticus* by submerged culture in a large volume of liquid medium. These attempts heretofore have been uniformly unsuccessful. The cultures invariably have become contaminated with yeast or spore forming bacilli.

I have now discovered a submerged culture fermentation technique for the fermentation of the organism *Micrococcus lysodeikticus* whereby a large volume of cells may be produced with minimum surface area and a minimum amount of overall space requirement.

Briefly stated, my invention comprises the steps of inoculating a nutrient medium with *Micrococcus lysodeikticus*, aerating and agitating the medium throughout the growth stage of the organism, maintaining the pH of the culture medium above about 7.0 throughout the growth stage, and separating an improved yield of cells of *Micrococcus lysodeikticus* from the growth medium.

The gist of the instant invention is the discovery that the growth medium throughout the growth stage must be maintained at a pH above about 7.0, preferably at a pH within the range of from 7.5 to 9.0.

The invention will be more clearly explained by reference to the following illustrative examples.

Example 1

The organism used in this example, *Micrococcus lysodeikticus*, was obtained from the American Type Culture Collection, No. 4698. The organism was maintained on agar slants at room temperature by transfers about once every 7 or 8 days. The agar medium for culture maintenance had the following composition:

1.0%—Yeast extract (Anheuser-Busch)
2.0%—Dextrose
0.5 M—Potassium acid phosphate (8.7 g./liter)
1.0%—Salt solution composed of:
    4.0%—Magnesium sulfate heptahydrate
    0.2%—Sodium chloride
    0.2%—Ferric sulfate heptahydrate
    0.16%—Manganese sulfate
2.0%—Agar The pH of the medium without the agar was brought to approximately 8.0 with a solution of potassium hydroxide (1 ml. of 50% KOH/liter) and then 2% agar was added to the medium after the pH adjustment. The mixture was brought to a boil, distributed into tubes, the tubes plugged with cotton and sterilized under pressure in the autoclave.

The liquid medium for the growth stage is made up in the form of three separate solutions as follows:

Solution A: Into a round bottom 12-liter flask are placed 9.1 liters of distilled water, 100 ml. of the salt solution given above and 85 g. of sodium bicarbonate (final molarity in the medium, 0.1 M). The surface of this liquid is sprayed with an antifoam agent such as a silicone polymer sold under the trade name "Dow Corning Antifoam A." The flask is stoppered with a cotton plug and autoclaved for one hour at 15 pounds pressure.

Solution B: 100 g. of yeast extract (Anheuser-Busch) and 400 ml. of water are placed in a 1-liter flask. The flask is stoppered with cotton and autoclaved for 20 minutes at 15 pounds pressure.

Solution C: Into a 500 ml. flask are placed 200 g. of dextrose and 300 ml. of water. The flask is stoppered with cotton and autoclaved for 20 minutes at 15 pounds pressure.

When the solutions are at room temperature, solutions B and C are added aseptically to solution A. The final pH of the mixed nutrient medium is 8.8.

The growth solution is inoculated with an inoculant which may be prepared by either of the following methods:

*Preparation 1.*—In a Corning No. 4422 culture flask containing 1-liter of the agar medium described above, cells of *Micrococcus lysodeikticus* are placed. The flask is allowed to stand for 48 hours at room temperature for growth. At the end of that period, an inoculant is prepared by washing the surface of the culture medium in the flask with sterile distilled water. The cell content of two of these flasks is used as an inoculum for the fermentation or growth stage.

*Preparation 2.*—Into a 250 ml. wide mouth Erlenmeyer flask are added 40 ml. of a solution containing 17 grams of sodium bicarbonate and 10 ml. of the salt solution per liter. In another 250 ml. Erlenmeyer flask are placed 40 ml. of a solution containing 20 grams of yeast extract and 40 grams of dextrose per liter. The two Erlenmeyer flasks are cotton stoppered and autoclaved at 15 pounds pressure for 20 minutes. When cooled, the contents of one flask are transferred asceptically to the other. The latter is inoculated with cells of *Micrococcus lysodeikticus*. This flask is shaken at room temperature for 48 hours and the contents then added aseptically as an inoculum for the fermentation or growth stage to the contents of the 12 liter flasks.

The liquid culture medium or growth solution of this example was inoculated with an inoculant prepared in accordance with Preparation 1 above and the medium was vigorously aerated by passing air through the liquid. The aeration system consisted of an air exhaust and an air intake line which passed through a rubber stopper in the flask. The intake air was filtered through sterile cotton and dispersed in the medium by means of a sintered glass plug. Prior to placing in the culture medium the entire aeration system was sterilized in an autoclave.

Aeration and agitation was continued for a growth period of about 48 hours at room temperature. The cells were then harvested by means of Sharples centrifuge. The total yield of cells was 3.5 g. (dry weight) per liter of medium.

Example II 250 ml. Erlenmeyer flask was used as the culture flask in this example. The medium was prepared according to the procedure described above for Preparation 2. The flask was inoculated with *Micrococcus lysodeikticus* cells and placed on a standard shaking machine. After shaking for a growth period of 48 hours at room temperature the cells were harvested with a Sharples centrifuge. The yield was 9.0 g. (dry weight) of cells per liter of medium.

Example III

In this pilot plant run the growth medium was prepared as follows:

Solution A:
| | |
|---|---|
| $NaHCO_3$ | g-- 510.0 |
| NaCl | g-- 12.0 |
| $FeSO_4 \cdot 7H_2O$ | g-- 12.0 |
| $MgSO_4 \cdot 7H_2O$ | g-- 240.0 |
| $MnSO_4$ | g-- 10.8 |
| Water | gal-- 12. |

Solution A was charged to a fermentation vessel equipped with an aerater and an agitator. The vessel and contents were then sterilized by heating to 250° F. at 15 pounds pressure for 60 minutes.

Solution B:
| | |
|---|---|
| Yeast extract | g-- 600 |
| Water | gal-- 1.5 |

This solution, in a stainless steel flask, was sterilized in an autoclave at 15 pounds pressure for 60 minutes.

Solution C:
| | |
|---|---|
| Dextrose | g-- 1200 |
| Water | gal-- 1.5 |

Solution C, in a stainless steel flask, was also sterilized in an autoclave for 60 minutes at 15 pounds pressure.

After the solutions had cooled to room temperature, solutions B and C were added aseptically to solution A. The pH of the mixture was 8.5.

The nutrient medium was then inoculated with cells of *Micrococcus lysodeikticus* prepared as in Preparation 2 described above.

The growth solution was agitated and aerated at a rate of 1.75 cu. ft. of air per minute for 48 hours at 90° F.

At the end of the growth cycle the cells were harvested by means of a Sharples centrifuge yielding 5.0 g. (dry weight) of cells per liter of medium.

Example IV

In accordance with the procedure described in connection with Example II above, a run was made omitting the $NaHCO_3$ buffering medium. After a growth cycle of 48 hours it was found that the flask had become contaminated with spore-forming rods and that there were no cells of *Micrococcus lysodeikticus* formed. This example indicates another advantage of the inventive concept in alkaline media in which the growth of undesirable contaminants is repressed.

Example V

In order to determine the pH range of the concept of this invention, a series of experiments were carried out as follows.

Standard 250 ml. shake flasks containing 80 ml. of the nutrient medium described in Example I above, excepting that the $NaHCO_3$ was omitted, were sterilized after the pH of the solutions were buffered with 0.1 M sodium phosphate solutions to the predetermined values. The flasks were then sterilized by autoclaving at 15 pounds for 20 minutes and inoculated with 1 ml. of a 30 ml. wash of an agar slant of *Micrococcus lysodeikticus* which was 24 hours old. After growth periods of 2, 3½, 5½ and 24 hours aliquot samples of the growth medium were taken and the yields determined. Results are set out in the table below.

TABLE I
*Effect of pH on yield of Micrococcus lysodeikticus*

| pH | g./liter (dry weight) of cells after: (hours) | | | |
|---|---|---|---|---|
| | 2.0 | 3.5 | 5.5 | 24.0 |
| 6.7 | .017 | .028 | .077 | 1.29 |
| 7.2 | .023 | .061 | .088 | 1.40 |
| 7.3 | .066 | .073 | .110 | 2.06 |
| 7.4 | .057 | .054 | .084 | 2.40 |
| 8.0 | .272 | .265 | .323 | 2.40 |
| 8.8 [1] | .157 | .200 | .225 | 2.34 |
| 9.0 | .198 | .109 | .176 | 2.30 |

[1] Control: buffered with $NaHCO_3$

It will be seen from the data above that at all sampling times the rate of cell production rises to a maximum at a pH of about 8.0 and that maximum cell production is obtained at a pH range of from about 7.4 to 8.8.

Example VI

In accordance with the procedure described in Example II above a series of experiments were carried out to determine the effect of pH on the yield of cells of *Micrococcus lysodeikticus* after a growth cycle of 48 hours. The solutions were adjusted to the desired pH with .1 M sodium phosphate solutions. The data obtained are set out in the table below:

TABLE II
*Effect of pH on yield of Micrococcus lysodeikticus cells—(48 hrs. growth cycle)*

| pH: | Yield (g./liter dry wt.) |
|---|---|
| 7.0 | 4.8 |
| 7.5 | 4.8 |
| 8.0 | 4.6 |
| 8.3 [1] | 4.5 |
| 8.5 | 5.1 |
| 9.0 | 4.7 |
| 9.5 | 4.5 |
| 10.0 | 1.2 |

[1] Control: buffered with $NaHCO_3$

The data above point out that the yield of cells of *Micrococcus lysodeikticus* drops off rapidly at a pH of 10 and that a range of from 7.0 to 9.5 is satisfactory for increased cell production.

It will be appreciated by those familiar with the art that the exact formulations given above may be varied without departing from the spirit of this invention. For example, the nutrient medium must contain the following basic requirements:

(1) Carbohydrates
(2) Proteinaceous materials
(3) Growth factors
(4) Mineral salts The following materials may be substituted for those given in the examples given above.

| Carbohydrates | Mineral Salts, Soluble Salts of— |
|---|---|
| Dextrose | Magnesium |
| Sucrose | Sodium |
| Maltose | Iron |
| Molasses | Potassium |
| Corn Syrup | Manganese |
| | Sulfur |
| | Phosphorus |

PROTEINACEOUS MATERIALS—GROWTH FACTORS

Yeast extract
Corn steep liquor
Autolysed yeast
Peptone

As was stated above, the gist of the invention relates to the maintenance during the growth stage of the pH of the culture medium above about 7.0, preferably within the range of 7.5 to 9.0. This may be accomplished by the use of various buffer solutions. In addition to the sodium bicarbonate recited above, other buffers may be used; such as potassium bicarbonate, potassium phosphate, sodium phosphate, sodium citrate, etc.

The molarity of the buffer solution can be as high as 0.2 M without causing any detectable effect on the growth of the organism. It has been further discovered, however, that 0.1 M of bicarbonate is adequate to keep the pH above 8.0 from 48 to 72 hours. The preferred embodiment of this invention contemplates the use of 0.1 M sodium bicarbonate as a buffer for the growth medium.

To reiterate briefly, the instant invention relates to an improved process for the production of cells of *Micrococcus lysodeikticus* wherein a submerged fermentation technique is utilized. The method comprises the steps of inoculating a nutrient medium containing carbohydrates, proteinaceous materials, growth factors, and mineral salts with the organism *Micrococcus lysodeikticus*, aerating and agitating the nutrient medium throughout the growth cycle, and maintaining the pH of the nutrient at about 7.0 to 9.5, preferably at about 7.5 to 9.0 throughout the growth cycle.

What is claimed is:

1. A method for the production of an improved yield of cells of *Micrococcus lysodeikticus* which comprises the steps of inoculating a nutrient medium with *Micrococcus lysodeikticus*, aerating and agitating the medium throughout the growth stage so as to establish conditions of submerged culture, maintaining the pH of the growth medium within a range of from about 7.5 to about 9.0 throughout the growth stage, and separating an improved yield of cells of *Micrococcus lysodeikticus* from the growth medium.

2. A process according to claim 1 wherein said nutrient medium comprises carbohydrates, proteinaceous materials, growth factors, and mineral salts.

3. A method according to claim 1 wherein the nutrient medium comprises yeast extract, dextrose, potassium phosphate, magnesium sulfate, ferric sulfate, sodium chloride, and manganese sulfate.

4. A method according to claim 1 wherein the growth medium is maintained within the desired pH range with sodium bicarbonate.

5. A method according to claim 1 wherein said growth medium is maintained at the pH range with a mixture of disodium phosphate and trisodium phosphate.

References Cited in the file of this patent

UNITED STATES PATENTS

| | | |
|---|---|---|
| 2,576,932 | Garibaldo et al. | Dec. 4, 1951 |
| 2,627,494 | Keko et al. | Feb. 3, 1953 |

OTHER REFERENCES

"Microorganisms and Fermentation," by Alfred Jorgensen, Charles Griffin and Company, London (1948), (page 378 relied on).

Herbert et al.: "Biochem. J." 43, 193 (1948).

Grula et al.: "J. Bact." 68, 171 (1954).

Saz et al.: "J. Bact." 67, 409 (1954).

Wessman et al.: "J. Bact." 67, 554 (1954).

"Zinsser's Textbook of Bacteriology," by Smith et al., 9th edition, Appleton-Century-Crafts, Inc., New York (pp. 242 and 243 relied on).